United States Patent
Uy et al.

(10) Patent No.: US 11,444,788 B2
(45) Date of Patent: Sep. 13, 2022

(54) AUTHENTICATION AND ACCESS CONTROL FOR DEVICE MANAGEMENT AND PROVISIONING

(71) Applicant: Verizon Patent and Licensing Inc., Basking Ridge, NJ (US)

(72) Inventors: Warren Hojilla Uy, Randolph, NJ (US); Young R. Choi, Belle Mead, NJ (US); Manuel Enrique Caceres, Basking Ridge, NJ (US); Emilia C. Quijano, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 218 days.

(21) Appl. No.: 16/847,082

(22) Filed: Apr. 13, 2020

(65) Prior Publication Data
US 2021/0320807 A1   Oct. 14, 2021

(51) Int. Cl.
*H04L 9/32* (2006.01)
*H04L 9/40* (2022.01)
*G06F 16/245* (2019.01)
*H04W 76/10* (2018.01)
*H04L 41/22* (2022.01)
*H04W 12/06* (2021.01)
*H04W 12/069* (2021.01)
(Continued)

(52) U.S. Cl.
CPC .......... *H04L 9/3268* (2013.01); *G06F 16/245* (2019.01); *H04L 41/22* (2013.01); *H04L 61/50* (2022.05); *H04L 63/0838* (2013.01); *H04L 63/0846* (2013.01); *H04L 63/0876* (2013.01); *H04L 63/102* (2013.01); *H04L 63/107* (2013.01); *H04W 12/068* (2021.01); *H04W 12/069* (2021.01); *H04W 76/10* (2018.02); *H04L 2101/622* (2022.05)

(58) Field of Classification Search
CPC ....... H04L 9/3268; H04L 41/22; H04L 61/20; H04L 63/0838; H04L 63/0846; H04L 63/0876; H04L 63/102; H04L 63/107; H04L 61/6022; H04L 41/0253; H04L 63/0823; H04L 61/103; H04L 61/2015; G06F 16/245; H04W 12/068; H04W 12/069; H04W 76/10; H04W 12/30
See application file for complete search history.

(56) References Cited

U.S. PATENT DOCUMENTS 7,114,070 B1 * 9/2006 Willming .......... H04L 29/12273
                                                380/30
9,661,599 B2 * 5/2017 Thomson .............. H04W 64/00
(Continued)

*Primary Examiner* — J. Brant Murphy

(57) ABSTRACT

A method or system for authentication and access control in for network device management is disclosed. The method or system may include establishing a communication channel between a user device and a network device and receiving, by the network device, a public-key certificate including a specified identity of the user device. The method or system may include determining whether the public-key certificate is valid against a root certificate stored in the network device, and determining an actual identity of the user device. The method or system may include indicating that the user device is authentic and authorized when the received public-key is valid against the root certificate and when the actual identity of the user device matches the specified identity in the public-key certificate.

20 Claims, 11 Drawing Sheets

(51) Int. Cl.
*H04L 61/50* (2022.01)
*H04L 101/622* (2022.01)

(56) References Cited

U.S. PATENT DOCUMENTS

| | | | |
|---|---|---|---|
| 2007/0011301 A1* | 1/2007 | Ong | H04L 61/2015 709/224 |
| 2007/0022469 A1* | 1/2007 | Cooper | H04L 9/3263 726/3 |
| 2009/0046633 A1* | 2/2009 | Thomson | H04W 12/06 370/328 |
| 2010/0088399 A1* | 4/2010 | Gluck | H04L 63/104 709/221 |
| 2011/0004895 A1* | 1/2011 | Ladd | H04N 21/4334 725/31 |
| 2018/0034815 A1* | 2/2018 | Thomas | H04L 63/162 |
| 2019/0208389 A1* | 7/2019 | Lazar | H04W 4/90 |
| 2020/0257827 A1* | 8/2020 | Kounavis | G06F 21/602 |
| 2021/0211878 A1* | 7/2021 | Dion | H04W 12/069 |

\* cited by examiner

HR DATABASE 624

| EMPLOYEE NAME 652 | EMPLOYEE NUMBER 654 | EMPLOYEE STATUS 686 |
|---|---|---|
| JOHN SMITH | 1234 | NOT CURRENTLY EMPLOYED |
| JANE SMITH | 4321 | CURRENTLY EMPLOYED |

650-1 → row 1
650-2 → row 2

TICKET DATABASE 622

| CUSTOMER NUMBER 682 | CUSTOMER LOCATION 684 | CPE DEVICE IDENTIFIER 685 | TIME WINDOW 686 | USER IDENTIFIER 688 | USER DEVICE IDENTIFIER 689 |
|---|---|---|---|---|---|
| 5678 | 123 MAIN STREET | B:C:D:E | FRIDAY 1300-1600 | 1234 | A:B:C:D |
| 8765 | 125 MAIN STREET | E:D:C:B | MONDAY 900-1200 | 4321 | D:C:B:A |

680-1 → row 1
680-2 → row 2

AUTHENTICATION AND ACCESS CONTROL FOR DEVICE MANAGEMENT AND PROVISIONING

BACKGROUND INFORMATION

To satisfy the needs and demands of data communication users, service providers continue to enhance and expand the services offered as well as the networks delivering such services. One such enhancement includes the development of Next Generation wireless systems designed to operate in the higher frequency ranges. Such systems may transmit and receive in many frequency bands, including the gigahertz (GHz) band, also known as the millimeter (mm) wave spectrum. The bandwidth of Next Generation wireless systems is expected to support high download speeds (e.g., 35-50 Gigabits per second). Next Generation wireless systems, such as Fifth Generation (5G) systems, are expected to enable a higher utilization capacity than current wireless systems, permitting a greater density of wireless users, at a lower latency.

BRIEF DESCRIPTION OF THE DRAWINGS

FIG. 6B is a diagram illustrating exemplary information stored a human resources database in one embodiment;

FIG. 6C is a diagram illustrating exemplary information stored a ticket database in one embodiment;

DETAILED DESCRIPTION

Figure 1:
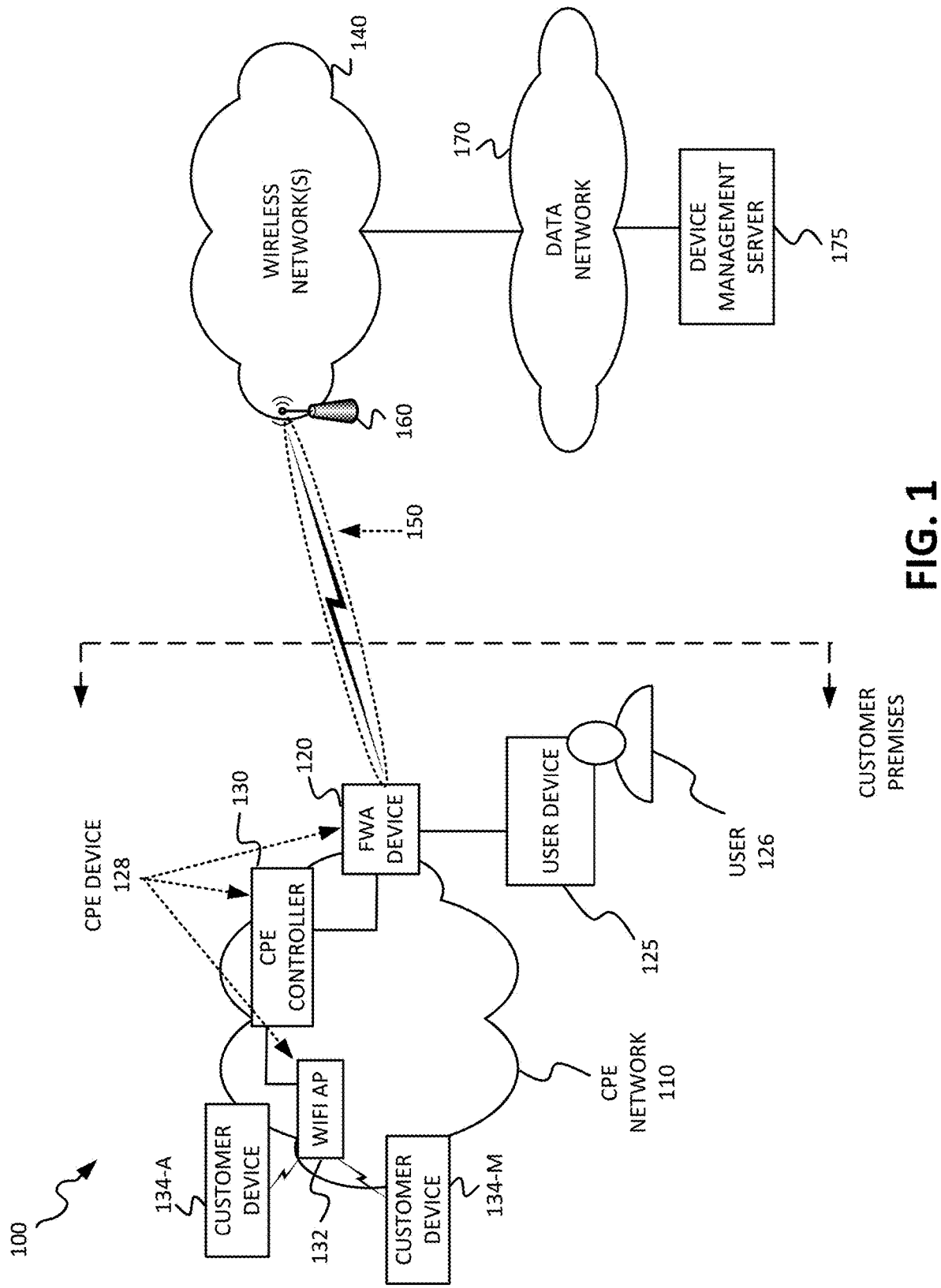
FIG. 1 is a block diagram illustrating an environment for authenticating and authorizing a user device according to one embodiment.

The following detailed description refers to the accompanying drawings. The same reference numbers in different drawings identify the same or similar elements. The following detailed description does not limit the invention, which is defined by the claims.

As communication networks and services increase in size, complexity, and number of users, management of the communication networks has become more complex. One way in which wireless access networks are continuing to become more complicated is by incorporating various aspects of advanced wireless systems, such as Fifth Generation (5G) service networks, utilizing high frequency bands, and/or lower frequency bands such as Sub 6 GHz, and a large number of antennas. 5G New Radio (NR) millimeter (mm) wave technology may provide significant improvements in bandwidth and/or latency over other wireless network technology.

The 5G NR mm-wave air interface may provide a high data throughput in comparison to the data throughput of a 4G Long Term Evolution (LTE) air interface. To take advantage of the high bandwidths available via the 5G NR air interface, a provider of communication services may deploy stationary or fixed wireless access (FWA) devices to provide telecommunication services, such as Internet service that includes Voice over Internet Protocol (VoIP), video streaming, live gaming, Internet browsing, etc. Thus, instead of a wired electrical connection (e.g., a coaxial cable connection, etc.) or an optical connection (e.g., an optical network terminal (ONT) to an optical fiber, etc.), an FWA device may connect a customer to a service network through one or more wireless stations (or access units) via over-the-air (OTA) signals. The FWA device may function as a UE device with respect to the wireless stations. Thus, an FWA device may be installed in a fixed location at the customer premises, such as a residence, an apartment building, an office building, etc.

However, because of the high mm-wave frequencies (e.g., 24-50 GHz), the 5G NR signals may be susceptible to intermittent, degradations due to multipath wave propagation and fading and/or other types of signal interference.

Such variations in signal quality may be particularly important in areas with a low density of 5G coverage, such as an area with the initial deployment of 5G wireless stations. The signal quality at an FWA device at a particular location may be increased through the placement of a FWA device relative to the 5G NR wireless station. The FWA device may be mounted on and/or near structural interfaces (e.g., windows, walls, glass doors, roofs, etc.). The FWA device may include an outdoor unit that attaches to an exterior surface of a structure, for example, where RF signals are measured or calculated to be powerful enough to penetrate the exterior. With correct placement of the FWA device, improved signal strength, SINR, and/or throughput within the wireless network may be obtained while avoiding overload conditions at the serving 5G wireless station. Additionally, when extending the range of 5G cell sites, increased cell spacing, reduces the number of needed cell site infrastructure (e.g., fewer wireless stations) within a given region.

It is often desirable to allow a user (e.g., a technician), when installing an FWA device, to log into the device (or other CPE devices) to monitor the signal quality (from the wireless station) so that the user can test different placements at the customer premises (for the best signal quality). It may not be sufficiently secure to provide the same username and password for each FWA device. On the other hand, a different password for each FWA device may make the user's job more time consuming, potentially resulting in the placement of the FWA device in a less-than-optimal location. Methods and systems disclosed herein may enable the user to log into the FWA device (or other CPE devices) with ease while maintaining sufficient security.

FIG. 1 is a block diagram of an exemplary environment 100 in which the systems and/or methods, described herein, may be implemented. As shown in FIG. 1, environment 100 may include a customer premises equipment (CPE) network 110, a wireless network 140, a data network 170, and/or a device management (DM) server 175.

CPE network 110 may include a local area network (LAN) associated with a customer's premises. For example, CPE network 110 may be located at or within a customer's residence, in an apartment building, in a school, in a commercial office building, in a shopping mall, in a connected mass transit vehicle (e.g., bus, train, plane, boat, etc.), and/or in another type of location associated with a customer of a provider of telecommunication services. CPE network 110 may receive services via a wireless connection such as, for example, a television service, Internet service, and/or voice communication (e.g., telephone) service. In one embodiment, CPE network 110 may be implemented as a gigabit network that enables gigabit speed connections. Additionally or alternatively, CPE network 110 may implement lower (e.g., a megabit) or higher network speed connections.

CPE network 110 may include an FWA device 120, a CPE controller 130, a WiFi access point 132, and customer devices 134-A to 134-M (referred to individually as "customer device 134" and collectively as "customer devices 134"). FWA device 120, CPE controller 130, and/or WiFi access point 132 may also be considered CPE devices 128 (individually referred to as "CPE device 128"). A CPE device 128 may be any device that is installed at a customer's premises. In some implementations, two or more of FWA device 120, CPE controller 130, and/or WiFi access point 132 may be integrated into a single CPE device 128. In some instances, CPE network 110 may also include a user device 125 and a user 126. User 126 may include a technician that is present at the customer's premises to install, configure, or monitor FWA device 120 and/or CPE controller 130. That is, a user may include a "technician" and user device 125 may be include laptop or "technician device." CPE device 128 may also be referred to as a "network device."

CPE network 110 may receive services via a wireless connection between an FWA device 120 and other wireless devices. FWA device 120 may be installed in a particular location at, or near, the customer premises. In some embodiments, FWA device 120 is installed in a location associated with good wireless signal reception. For example, FWA device 120 may be installed on a building's exterior (e.g., on a roof, attached to an outside wall, attached to a window, etc.) or a building's interior (e.g., next to a window). FWA device 120 may be configured to attach to, and communicate with, wireless network 140 and may be perceived as a user equipment (UE) device by wireless network 140. FWA device 120 may be configured to communicate via any type of air interfaces or a combination of air interfaces, such as e.g., both a 4G LTE air interface and a 5G NR air interface.

CPE controller 130 may include a network device configured to function as a type of switch and/or router for devices in CPE network 110. CPE controller 130 may connect devices in CPE network 110 to FWA device 120. CPE controller 130 may include a layer 2 and/or layer 3 network device, such as a switch, router, firewall, and/or gateway and may support different types of interfaces, such as an Ethernet interface, a wireless interface (e.g., Bluetooth, radio-frequency identification (RFID), near field communication (NFC), and/or WiFi), a Multimedia over Coaxial Alliance (MoCa) interface, and/or other types of interfaces. CPE controller 130 may further manage WiFi access points 132 and/or customer devices 134 connected to WiFi access points 132.

WiFi access point 132 may include a transceiver configured to communicate with customer devices 134 using WiFi signals, such as those based on the Institute of Electrical and Electronics Engineers (IEEE) 802.11 standards for implementing a wireless LAN network. WiFi access point 132 may enable customer devices 134 to communicate with each other and/or with FWA device 120 via CPE controller 130. WiFi access point 132 may be connected to CPE controller 130 via a wired connection (e.g., an Ethernet cable). Furthermore, WiFi access points 132 may include one or more Ethernet ports for connecting customer devices 134 via a wired Ethernet connection. In some implementations, FWA device 120 may include, and/or perform the functions of, CPE controller 130 and/or WiFi access point 132.

Customer device 134 may include any computer device that connects to a particular WiFi access point 132 using WiFi wireless signals. For example, customer device 134 may include a handheld wireless communication device (e.g., a mobile phone, a smart phone, etc.); a wearable computer device (e.g., a head-mounted display computer device, a head-mounted camera device, a wristwatch computer device, etc.), a global positioning system (GPS) device; a laptop computer, a tablet computer, or another type of portable computer; a desktop computer; a set-top box or a digital media player (e.g., Apple TV, Google Chromecast, Amazon Fire TV, etc.); a smart television; a portable gaming system; a home appliance device; a home monitoring device; and/or any other type of computer device with wireless communication capabilities. Customer device 134 may be used for voice communication, mobile broadband services (e.g., video streaming, real-time gaming, premium Internet access etc.), best effort data traffic, and/or other types of applications. As another example, customer device 134 may correspond to an embedded wireless device that communicates wirelessly with other devices over a machine-to-machine (M2M) interface using machine-type communication (MTC) and/or another type of M2M communication.

As noted, CPE network 110 may at times include user device 125. User device 125 may be used by a user 126 when installing equipment in CPE network 110, such as CPE device 128 (e.g., FWA device 120). User device 125 may alternatively or additionally include a tablet computer, a mobile phone, and/or any other computer device. As disclosed herein, CPE device 128 may authenticate and authorize user device 125 (and user 126 using user device 125) at times.

Wireless network 140 may provide access to data network 170 for devices, such as FWA device 120. Wireless network 140 may enable FWA device 120 to connect to data network 170 for mobile telephone service, Short Message Service (SMS) message service, Multimedia Message Service (MMS) message service, Internet access, cloud computing, and/or other types of data services.

Wireless network 140 may establish or may be incorporated into a packet data network connection between FWA device 120 and data network 170 via one or more Access Point Names (APNs). If wireless network 140 includes a 5G SA architecture that implements network slicing, wireless network 140 may establish a packet data network connection between FWA device 120 and a particular network data network via a Data Network Name (DNN). Thus, wireless network 140 may establish an Internet Protocol (IP) connection between FWA device 120 and data network 170 or another network reachable via data network 170. Furthermore, wireless network 140 may enable FWA device 120 to communicate with an application server, and/or another type of device, located in data network 170 using a communication method that does not require the establishment of an IP connection between FWA device 120 and data network 170, such as, for example, Data over Non-Access Stratum (DoNAS).

In some implementations, wireless network 140 may include an LTE access network (e.g., an evolved packet core (EPC) network). In other implementations, wireless network 140 may include a Code Division Multiple Access (CDMA) access network. For example, the CDMA access network may include a CDMA enhanced High Rate Packet Data (eHRPD) network (which may provide access to an LTE access network).

Furthermore, wireless network 140 may include an LTE Advanced (LTE-A) access network and/or a 5G access network or other advanced network that includes functionality such as carrier aggregation; higher-order modulation schemes, such as 256 quadrature amplitude modulation (QAM), 1024-QAM, etc.; advanced or massive multiple-input and multiple-output (MIMO) configurations (e.g., a 4×4 antenna configuration, an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Wireless network 140 may include LTE EPC network elements, such as a Mobility Management Entity (MME), a Serving Gateway (SGW), a Packet Data Network Gateway (PGW), a Home Subscriber Server (HSS), a Policy and Charging Rules Function (PCRF), and/or other EPC network elements. In other implementations, wireless network 140 may include a 5G Standalone (SA) architecture that includes 5G network functions such as an Access and Mobility Function (AMF), a User Plane Function (UPF), a Session Management Function (SMF), an Application Function (AF), a Unified Data Management (UDM), a Policy Control Function (PCF), a Network Repository Function (NRF), a Network Exposure Function (NEF), a Network Slice Selection Function (NSSF), and/or other 5G SA network elements. Furthermore, the 5G SA network may be configured to implement network slicing.

5G NR coverage may initially be deployed as islands relative to existing air interface coverage. Thus, areas with 5G NR coverage may also provide existing 4G LTE coverage, and UE devices enabled to communicate using 5G NR may be able to attach to both a 4G wireless station and a 5G wireless station. A UE device may be simultaneously attached to a master cell group (MCG), also known as a master eNodeB, and a secondary cell group (SCG), also known as a secondary eNodeB. If 5G NR coverage is available, the SCG may correspond to a 5G NR wireless station, referred to as a gNodeB. Dual coverage using 4G and 5G networks may be referred to as Non-Standalone (NSA) architecture.

Thus, as described herein, wireless network 140 may include a 4G wireless station (e.g., an eNodeB (not shown)) and a 5G wireless station 160 (e.g., a gNodeB). The 4G wireless station and 5G wireless station 160 may each include one or more RF transceivers that include devices and/or components configured to enable wireless communication with FWA devices 120. The 4G wireless station may be configured to communicate with FWA device 120 using a 4G LTE wireless signal 150. 5G wireless station 160 may be configured to communicate with FWA device 120 using a 5G NR wireless signal 150.

Data network 170 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of data network 170 may be managed by a provider of communication services that also manages wireless access network 140 and/or FWA device 120. Data network 170 may allow the delivery of Internet Protocol (IP) services to FWA device 120 and may interface with other external networks. Data network 170 may include one or more server devices and/or network devices, or other types of computation or communication devices. In some implementations, data network 170 may include an IP Multimedia Subsystem (IMS) network (not shown in FIG. 1). An IMS network may include a network for delivering IP multimedia services and may provide media flows between FWA device 120 and external IP networks or external circuit-switched networks (not shown in FIG. 1).

DM server 175 may include information for management of devices, such as user device 125, FWA device 120, and/or CPE controller 130. For example, user device 125 may include information for CPE device 128 to authenticate and authorize user device 125. DM server 175 may also be referred to as a "network device."

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
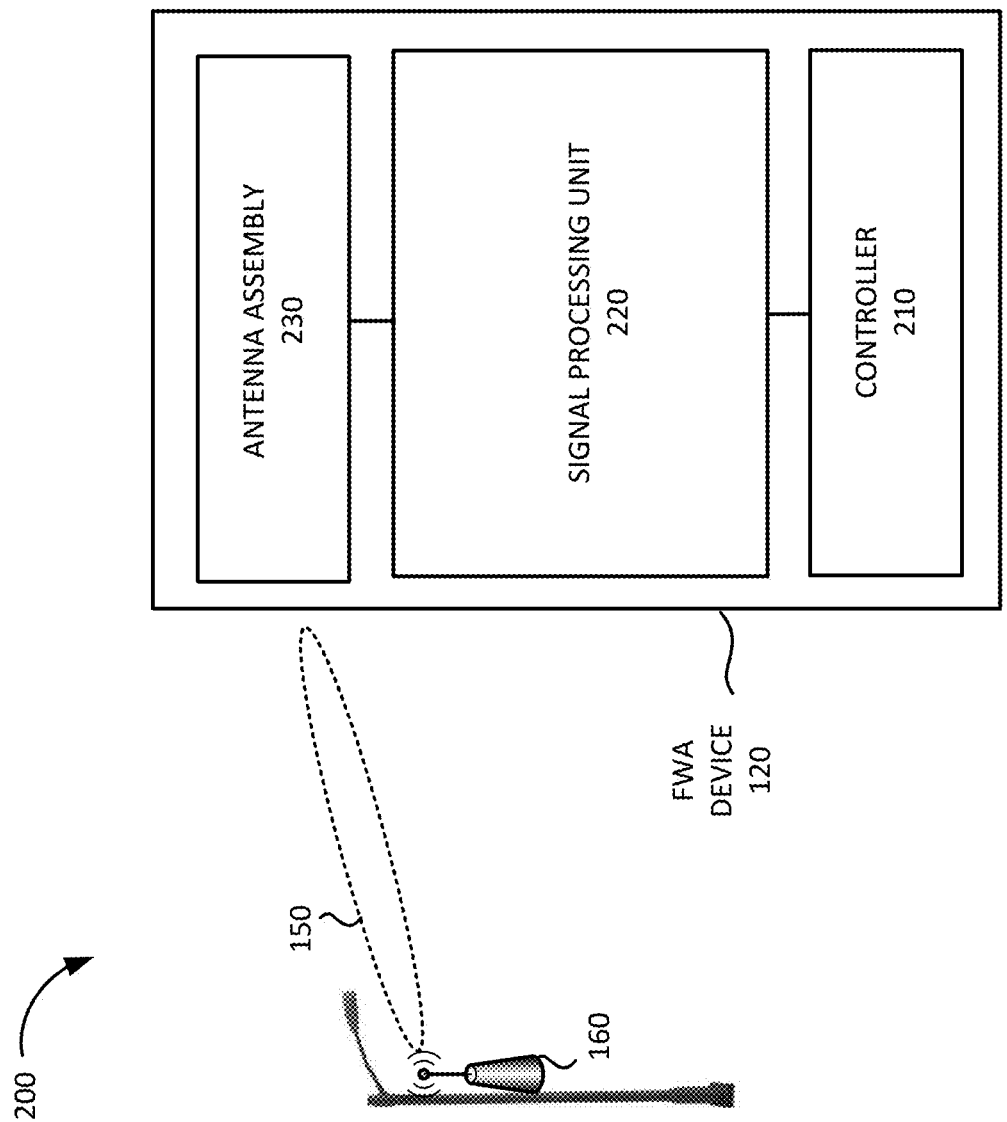
FIG. 2 is a block diagram illustrating an exemplary system that includes a fixed wireless access device.

FIG. 2 is a diagram illustrating an exemplary system 200 that includes FWA device 120. As shown in FIG. 2, system 200 may include 5G station 160 (e.g., attached to a light pole in this example) and/or FWA device 120. FWA device 120 may include a controller 210, a signal processing unit 220, and/or an antenna assembly 230.

Controller 210 may control the operation of FWA device 120. Signal processing unit 220 may include elements to receive signals from 5G wireless station 160 before sending signals toward CPE controller 130. Signal processing unit 220 may include elements to receive signals from CPE controller 130 before transmitting the signals toward 5G wireless station 160. In one embodiment, signal processing unit 220 may report to controller 210 the strength of a wireless signal 150 being received from wireless station 160. Using a graphical user interface, user 126 may use this information when selecting a location to place FWA device 120 at the customer's premises.

Antenna assembly 230 may include an antenna and/or an array of antenna elements configured to send and receive wireless signals, such as 5G NR signals. If FWA device 120 is not integrated with CPE controller 130, and FWA device 120 communicates with CPE controller 130 wirelessly, then antenna assembly 230 may send and/or receive wireless signals to/from CPE controller 130. If FWA device 120 is integrated with CPE controller 130 and WiFi access point 132, then antenna assembly 230 may send and/or receive wireless signals to/from customer devices 134.

Although FIG. 2 shows exemplary components of system 200, in other implementations, system 200 may include fewer components, different components, differently arranged components, or additional functional components than depicted in FIG. 2.

Figure 3:
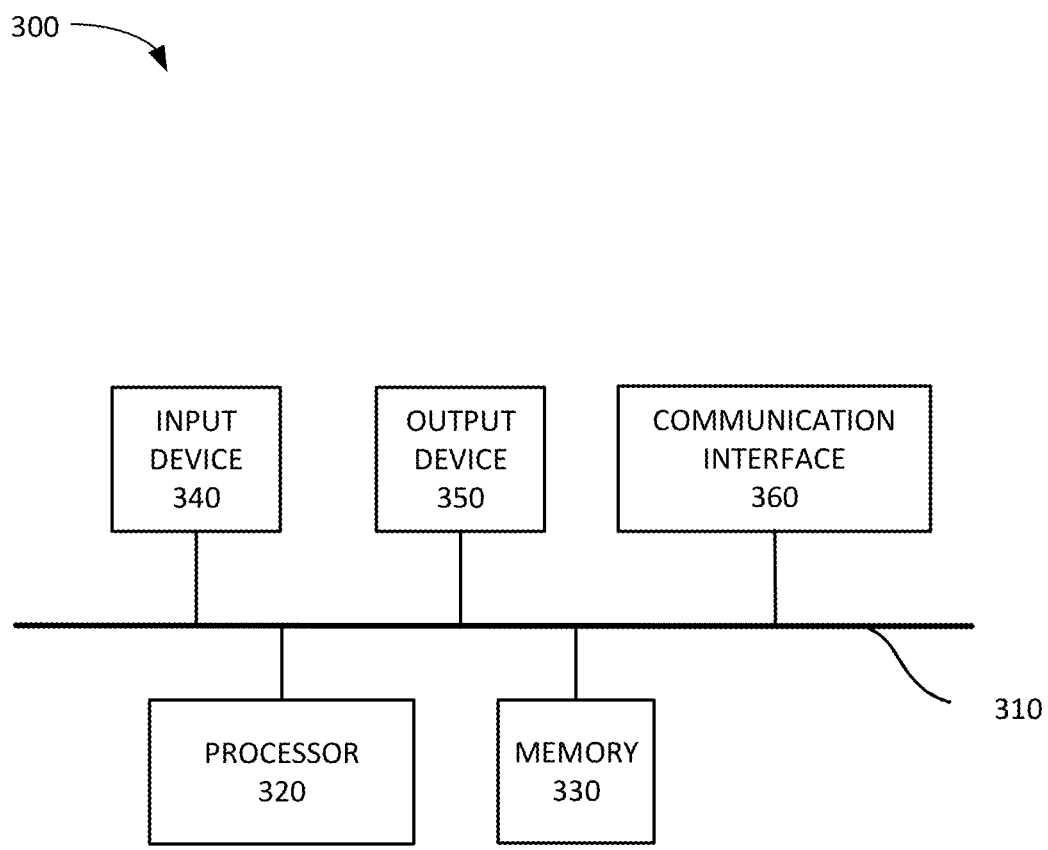
FIG. 3 is a block diagram illustrating example components of a computer device according to one embodiment.

FIG. 3 is a block diagram illustrating example components of a computer device 300 according to one embodiment. FWA device 120, user device 125, CPE controller 130, WiFi access point 132, customer device 134, DM server 175, and/or 5G wireless station 160 may each include one or more computer devices 300. As shown in FIG. 3, computer device 300 may include a bus 310, a processor 320, a memory 330, an input device 340, an output device 350, and a communication interface 360.

Bus 310 includes a path that permits communication among the components of computer device 300. Processor 320 may include any type of single-core processor, multi-core processor, microprocessor, latch-based processor, and/or processing logic (or families of processors, microprocessors, and/or processing logics) that executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth wireless interface, a RFID interface, a NFC wireless interface, and/or any other type of interface that converts data from one form to another form.

Device 300 may perform certain operations relating to authentication, authorization, and/or configuration of CPE device 128 in a customer premises location. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
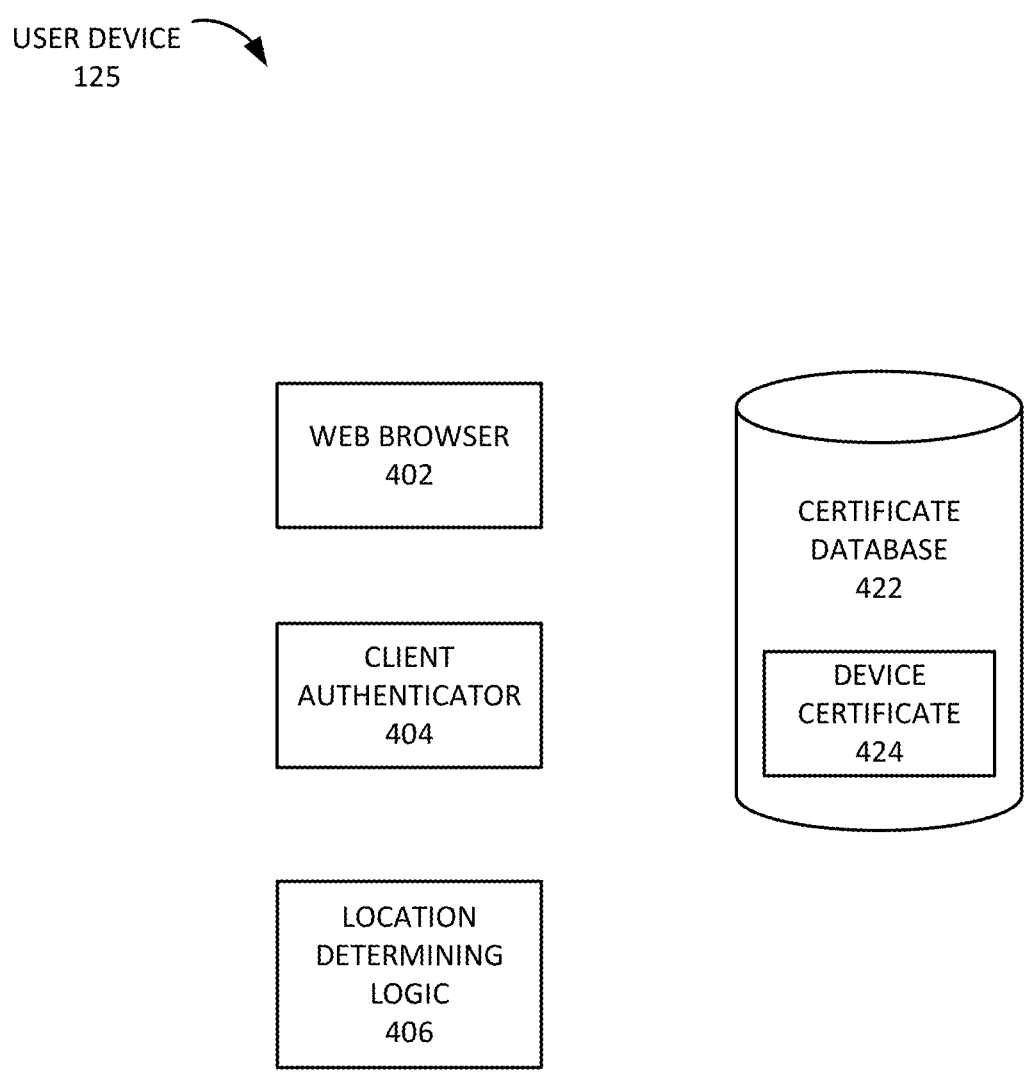
FIG. 4 is a block diagram illustrating exemplary functional components of a user or user device in one embodiment.

FIG. 4 is a block diagram illustrating exemplary functional components of and information stored in user device 125 in one embodiment. The components of user device 125 may be implemented, for example, via processor 320 executing instructions from memory 330. Alternatively, some or all of the functional components of user device 125 may be implemented via hard-wired circuitry. The information stored in user device 125 may be stored as a database in memory 330, for example. As shown in FIG. 4, user device 125 may include web browser 402, client authenticator 404, location determining logic 406, and/or certificate database (DB) 422.

Web browser 402 is a software application used to locate, retrieve, interpret, and display HTML content, such as web pages, images, video and other files. Web browser 402 is a client that runs on user device 125 (or another technician device) that requests information from a web server (discussed below with respect to FIG. 5). When the information is received from the web server, web browser 402 displays the information. Web browser 402 may include Chrome and/or Chromium from Google, Firefox from the Mozilla foundation, Internet Explorer from Microsoft, Edge from Microsoft, and/or Safari from Apple.

Client authenticator 404 includes logic to communicate with CPE device 128 to authenticate and/or authorize user device 125 and/or user 126 to CPE device 128. Client authenticator 404 may also communicate with DM server 175 to authenticate and/or authorize user device 125 and/or user 126 to CPE device 128. For example, client authenticator 404 may present credentials to CPE device 128 to authenticate user device 125 and/or user 126 to CPE device 128. Client authenticator 404 may request credentials from DM server 175 to present to CPE device 128 for authorization to use a web-based configuration interface of CPE device 128.

Location determining logic 406 may determine the location of user device 125. According to one implementation, location determining logic 406 may use technologies and techniques to provide location, such as, for example, satellite-based positioning (e.g., GPS, differential GPS (DGPS), and/or GLONASS), or cellular-based positioning (e.g., triangulation, Enhanced Observed Time Difference (E-OTD), Uplink Time Difference of Arrival (U-TDOA), and/or assisted GPS).

Certificate DB 422 may store certificates (which may be referred to as cryptographic certificates, digital certificates, and/or public-key certificates), such as device certificate 424 to authenticate user device 125 to CPE device 128. In one embodiment, certificate 424 in certificate DB 422 may include an X.509 certificate. X.509 is a cryptographic standard that defines a format of public key certificates. X.509 certificates may be used for electronic signatures. In this case, an X.509 certificate may include a public key and an identity. The identity may include a specified identity such as a media access control (MAC) address, an International Mobile Equipment Identity (IMEI), and/or a UUID (universally unique identifier). The certificate may be signed by a certificate authority (CA) or self-signed. In this embodiment, DM server 175 may be associated with a trusted CA or otherwise associated with the private key that corresponds to the public key in a certificate. When the certificate is signed by a trusted CA, or validated by other means, CPE device 128 can rely on the public key in certificate 424 to authenticate and validate information (e.g., an identifier such as a MAC address or a name) in device certificate 424, establish secure communications with another party (e.g., user device 125), or validate documents digitally signed by the corresponding private key. When certificate 424 is associated with a trusted CA, the CA issues a certificate binding a public key to an identifier (e.g., a hardware address, such as a MAC address). The trusted root certificates can be distributed to CPE devices (e.g., CPE device 128).

Although FIG. 4 shows exemplary components in user device 125, in other embodiments and implementations, user device 125 may include fewer components, different components, differently arranged components, or additional components than depicted in FIG. 4. Additionally, or alternatively, one or more components of user device 125 may perform functions described as being performed by one or more other components of user device 125. As noted above, user device 125 may alternatively or additionally include a tablet computer, a mobile phone, and/or any other computer device. For example, in addition to storing certificate database 422, memory 330 of user device 125 may store information such as a user identifier (e.g., an employee number or username), and/or the device identifier of device 125 (e.g., a MAC address or IMEI).

Figure 5:
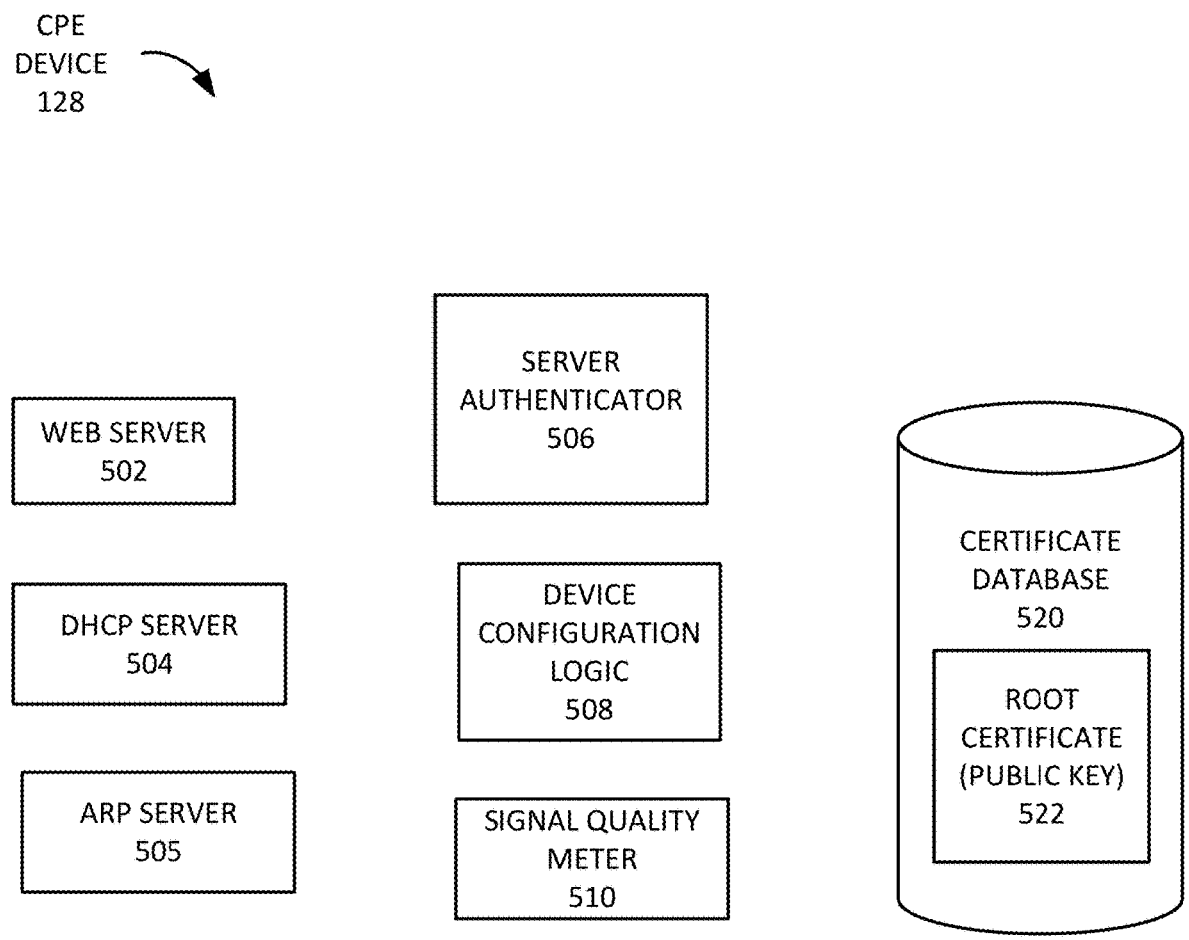
FIG. 5 is a block diagram illustrating exemplary functional components of customer-premises equipment device in one embodiment.

FIG. 5 is a block diagram illustrating exemplary functional components of CPE device 128 (e.g., FWA device 120, CPE controller 130, and/or WiFi access point 132). The components of CPE device 128 may be implemented, for example, via processor 320 executing instructions from memory 330. Alternatively, some or all of the functional components of CPE device 128 may be implemented via hard-wired circuitry. As shown in FIG. 4, CPE device 128 may include web server 502, DHCP server 504, ARP server 505, server authenticator 506, device configuration logic 508, signal quality meter 510, and/or certificate DB 520. Certificate DB 520 may include root certificate 522.

Web server 502 may deliver web pages or content to a client web browser 402 over a network, such as CPE network 110. Web server 502 may also receive content from web browser 402 (e.g., through a web form). As such, web server 502 may provide a graphical user interface (GUI) to device configuration logic 508 so that user 126 can use web browser 402 on user device 125 to install, configure, and/or monitor CPE device 128. Web server 502 may be associated with an IP address and possibly a domain name. For example, if the IP address to CPE device 128 is 192.168.1.1, user 126 can enter the URL http://192.168.1.1/index.html into web browser 402, which sends a request to web server 502. Web server 502 then fetches the page named index.html and sends it to web browser 402. Web server 502 may include web serving software, such as Apache of Apache Software Foundation, Internet Information Services (IIS) by Microsoft Corp., Nginx by Nginx, Inc., or Google Web Server (GWS) by Google, Inc., to deliver web content via CPE network 110 for presentation by web browser 402.

DHCP server 504 uses the DHCP protocol to assign IP addresses to devices on a network, such as user device 125 and/or customer device 134. ARP server 505 uses the ARP protocol to discover the link layer address, such as a MAC address, associated with a given internet layer address (e.g., an IPv4 and/or IPv6 address).

Server authenticator 506 may authenticate and authorize user device 125. For example, server authenticator 506 may receive device certificate 424 from client authenticator 404 in CPE device 128, validate device certificate 424 against root certificate 522, and authenticate and/or authorize CPE device 128 and/or user 126.

Device configuration logic 508 allows user 126 to configure and/or monitor CPE device 128. For example, user 126 may configure FWA device 120 with the correct parameters to communicate with wireless station 160. User 126 may configure WiFi access point 132 with a WiFi password for customers to use WiFi access point 132. User 126 may interact with device configuration logic 508 from user device 125 using a GUI through web browser 402 interacting with web server 502. In one embodiment, user 126 may monitor received signal strength as reported from signal quality meter 510 through web server 502 to web browser 402 as user 126 navigates a customer's premise to determine the best location for FWA device 120.

Signal quality meter 510 reports the signal strength from wireless station 160. In one embodiment, user 126 may use the information from signal quality meter 510 to determine the correct placement of FWA device 120. The signal quality or strength determined by signal quality meter 510 may be based on, for example, one or more of the following: a Reference Signal Received Power (RSRP) value, a Reference Signal Received Quality (RSRQ) value, a Received Signal Strength Indication (RSSI) value, a signal-to-interference plus noise ratio (SINR) value, a signal to noise ratio (SNR) value, a block error rate (BLER) value, an amplifier gain setting value, a channel state information (CSI) report (including, e.g., Channel Quality Indicator (CQI), Precoding Matrix Indicator (PMI), Rank Indicator (RI), etc.), and/or another type of signal characteristic value.

Although FIG. 5 shows exemplary components in CPE device 128, in other embodiments and implementations, CPE device 128 may include fewer components, different components, differently arranged components, or additional components than depicted in FIG. 5. Additionally, or alternatively, one or more components of CPE device 128 may perform functions described as being performed by one or more other components of CPE device 128. As noted above, CPE device 128 may alternatively or additionally integrate two or more of FWA device 120, CPE controller 130, and/or WiFi access point 132 into a single CPE device 128.

Figure 6A:
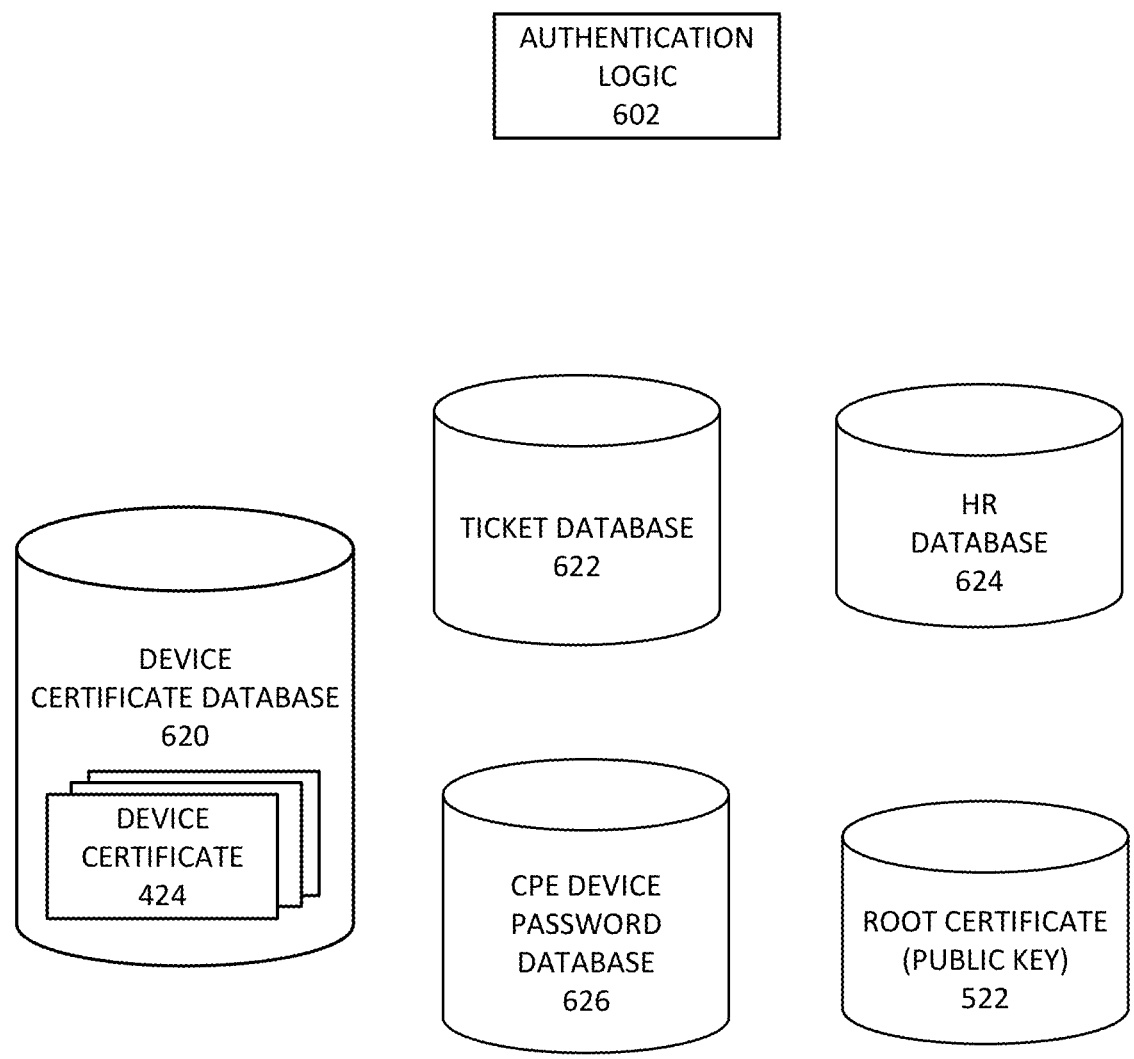
FIG. 6A is a block diagram illustrating exemplary functional components of a device management server.

FIG. 6A is a diagram illustrating exemplary functional components of DM server 175. The components of DM server 175 may be implemented, for example, via processor 320 executing instructions from memory 330. Alternatively, some or all of the functional components of DM server 175 may be implemented via hard-wired circuitry. As shown in FIG. 6A, DM server 175 may include authentication logic 602, device certificate DB 620, ticket DB 622, HR DB 624, CPE device password DB 626, and/or root certificate 522.

Authentication logic 602 may perform authentication and/or authorization functions in environment 100. For example, authentication logic 602 may generate device certificates that are issued to CPE devices, such as device certificate 424 being issued to user device 125. Authentication logic 602 may authorize user 126 to configure devices in a customer premises, such as CPE device 128 in environment 100.

Device certificate DB 620 stores cryptographic certificates for CPE devices, such as CPE device 128 in environment 100. In one embodiment, each certificate is unique to each CPE device 128. For example, device certificate 424 includes the MAC address of FWA device 120. In another embodiment, device certificate 424 may include the IMEI of FWA device 120.

Ticket DB 622 may store information regarding which user, such as user 126, is to deliver a service to which customer and to which CPE device, such as FWA device 120. ticket DB 622 may also store a timeframe in which the service is to be performed (e.g., a 4 hour window on a particular date) and/or the location (e.g., a street address and/or a latitude and longitude). In one embodiment, ticket DB 622 may store the identity of the user device (e.g., a MAC address) that the user is authorized to use to access the customer's equipment. In one embodiment, server authentication logic 602 may query ticket DB 622 to determine if user 126 is authorized to access CPE device 128 at a given time at a given location. That is, authentication logic 602 may determine if the location of user device 125 is near the location associated with the ticket for service. Authentication logic 602 may also determine if the current time is close to the time associated with the ticket for service. If the location of user device 125 and/or the time is not near and/or close to the location and time of the ticket for service, authorization may be denied to user device 125 and/or user 126 accessing CPE device 128.

HR DB 624 may store information regarding which user, such as user 126, is still employed by a service provider (such as the service provider of network 140) associated with CPE device 128. That is, if user 126 is no longer employed, then this would be reflected in HR DB 624. In one embodiment, authentication logic 602 may query HR DB 624 to determine whether user 126 is authorized to access CPE device 128.

CPE device password DB 626 may store credentials for CPE devices, such as CPE device 128. For example, CPE device password DB 626 may store the password or information for authentication logic 602 to derive a one-time password or token for each CPE device. For example, CPE device password DB 626 may identify a cryptographic one-time password algorithm and a secret (e.g., seed) to generate the one-time password. The cryptographic one-time password algorithm may include the HMAC-based one-time password (HTOP) algorithm specified in Internet Engineering Task Force (IETF) RFC 4226, for example. In this case, CPE device password DB 626 may also store a current counter value for generating the one-time password. Additionally or alternatively, the cryptographic one-time password algorithm may include an extension to the HTOP algorithm, such as the time-based one-time password (TOTP) algorithm, specified in IETF standard RFC 6238.

Root certificate 628 may be issued by a trusted CA and stored in DM server 175 in one embodiment. That is, when certificate 424 is associated with a trusted CA, root certificate 628 binds a public key (e.g., device certificate 424) to an identifier, such as a hardware address (e.g., a MAC address or an IMEI). Root certificate 628 can be distributed to CPE devices (e.g., CPE device 128).

Although FIG. 6A shows exemplary components in DM server 175, in other embodiments and implementations, DM server 175 may include fewer components, different components, differently arranged components, or additional components than depicted in FIG. 6A. Additionally, or alternatively, one or more components of DM server 175 may perform functions described as being performed by one or more other components of DM server 175.

FIG. 6B is a diagram illustrating exemplary information stored HR DB 624 according to one embodiment. Authentication logic 602 may use the information in HR DB 624 to determine whether a user (e.g., associated with an employee name and/or employee number) is authorized to access a CPE device, such as CPE device 128. As shown in FIG. 6B, HR DB 624 may include one or more records 650 (individually "record 650" or "record 650-x" and collectively "records 650"). Each record 650 may store information relating to the employment status of users associated with an employee identifier, such as an name and/or number. For example, HR DB 624 may include information about the employment status of user 126. As shown in FIG. 6B, HR DB 624 may include a name field 652, an employee number field 654, and/or an employment status field 656.

Name field 652 may store a name associated with an employee, such as a given name and a family name. For example, record 650-1 specifies an employee name of John Smith in name field 652. Employee number field 654 may store an identifier (e.g., a unique identifier) associated with the corresponding employee. For example, record 650-1 specifies an employee number of 1234. Name field 652 and/or employer number field 654 may each or in combination be referred to as a username field or an identifier field that stores a username or identifier.

Employee status field 656 may store information regarding the status of employment. The status of employment may specify whether the corresponding employee is currently employed, is no longer employed, and/or not yet employed. For example, an employee identified in record 650 may quit and no longer be employed while still being listed in the database for record keeping. As another example, an employee identified in record 650 may have been hired but has not yet started working. In these cases, an employment status of "not currently employed" may be recorded in field 656. Further, an employee identified in record 650 may be currently be employed and working. In this case, an employment status of "currently employed"

may be recorded in field 656. In the example of FIG. 6B, record 650-1 specifies that John Smith (employee number 1234) is not currently employed, while record 650-2 specifies that Jane Smith (employee 4321) is currently employed. In one embodiment, authentication logic 602 uses employee status field 656 to determine whether a user identity (e.g., name and/or an employee number) associated with a user is authorized to access a CPE device, such as CPE device 128.

Although FIG. 6B shows exemplary components of HR DB 624, in other implementations, HR DB 624 may include fewer fields, different fields, additional fields, or differently arranged fields than depicted in FIG. 6B. For example, HR DB 624 may include a start date field and/or an end date field to specify when an employee starts employment and/or when an employee ends employment. Also, while HR DB 624 is described as a "human resource" database, it can include a listing of any type of persons, not necessarily employees of a service provider. For example, the database could include the names of users that are customers of the service provider. As another example, the database could include the names of students and student numbers. HR DB 624 may also be referred to as a user database.

FIG. 6C is a diagram illustrating exemplary information stored in ticket DB 622 according to one embodiment. Authentication logic 602 may use the information in ticket DB 622 to determine whether a user associated with a user identity and/or a user device is authorized to access a CPE device, such as CPE device 128. As shown in FIG. 6C, ticket database 622 may include one or more records 680 (individually "record 680" or "record 680-*x*" and collectively "records 680"). Each record 680 may store information relating to a scheduled visit by a user (e.g., user 126 of user device 125) to a customer premises. For example, if user 126 of user device 125 is a technician working for a service provider, then ticket database 622 may include information about when user 126 is scheduled to visit a customer's premises. Ticket DB 622 may include a customer number field 682, a customer location field 684, CPE device identifier field 685, a time window field 686, a user identifier field 688, and/or a user device identifier field 689.

Customer number field 682 may store an identifier (e.g., a unique identifier) associated with the corresponding customer. For example, record 680-1 specifies a customer number of 5678 in customer number field 682. Record 680-2 specifies a customer number of 8765 in customer number field 682.

Customer location field 684 may specify the location of the corresponding customer. Customer location field 684 may specify the street address, global coordinates (e.g., latitude and/or longitude), or other location data. For example, record 680-1 specifies a customer location of 123 Main Street in customer location field 684. In one embodiment, authentication logic 602 may determine whether the location of a user device (e.g., user device 125) is in the appropriate location before authorizing access to a CPE device.

CPE device identifier field 685 may identify (e.g., uniquely identify) the CPE device at the customer's premises that the user is scheduled to service, for example. The identity of the CPE user device (e.g., CPE device 128) may include, for example, a MAC address, an IMEI and/or a UUID. Record 680-1 specifies that the user device identifier is B:C:D:E. In one embodiment, authentication logic 602 uses CPE device identifier field 685 to determine whether a user device and/or user identifier is authorized to access the CPE device, such as CPE device 128.

Time window field 686 may specify when the user (e.g., specified in user identifier field 688) is scheduled to service or authenticate to CPE equipment. Record 680-1 specifies a time window of Friday from 1300 to 1600. In one embodiment, authentication logic 602 may determine whether the current time is in the window specified in time window field 686 before authorizing access to a CPE device.

User identifier field 688 may identify the user (e.g., user 126) that is scheduled to visit the corresponding customer. Record 680-1 specifies that the user with an identifier of 1234 is scheduled to visit customer 5678. User device identifier field 689 may identify (e.g., uniquely identify) the device assigned to the corresponding user for use during the visit to the corresponding customer. The identity of the user device may include, for example, a MAC address, an IMEI and/or a UUID. Record 680-1 specifies that the user device identifier is A:B:C:D. In one embodiment, authentication logic 602 uses ticket DB 622 to determine whether a user device associated with a user identifier is authorized to access a CPE device, such as CPE device 128.

Although FIG. 6C shows exemplary components of ticket DB 622, in other implementations, ticket DB 622 may include fewer fields, different fields, additional fields, or differently arranged fields than depicted in FIG. 6C. For example, ticket DB 622 may include a field to specify the type of work to be performed by user 126.

Figure 7:
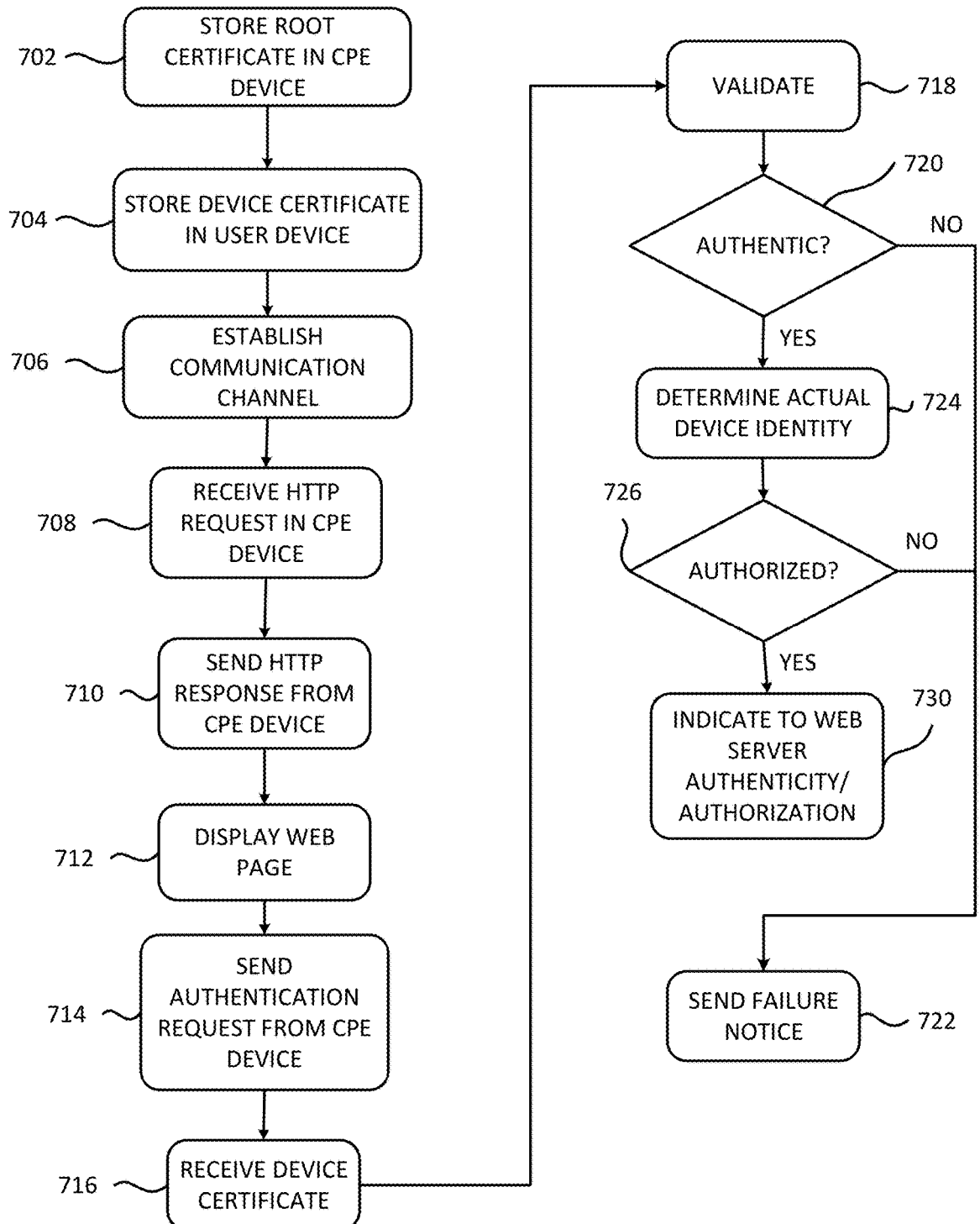
FIG. 7 is a flowchart of an exemplary process for authenticating and/or authorizing a user device in one embodiment.

FIG. 7 is a flowchart of a process 700 for authenticating and/or authorizing user device 125 to CPE device 128 in one embodiment. In some implementations, process 700 may be performed by user device 125 and CPE device 128. In other implementations, some or all of process 600 may be performed by another device or a group of devices separate from user device 125 and CPE device 128, such as DM server 175. Process 700 is described with respect to FIG. 8, which illustrates an exemplary signal flow 800 in one embodiment.

In the example of process 700, before user 126 arrives at the customer premises, root certificate 522 may be stored in CPE device 128 (block 702) (e.g., in memory 330 such that root certificate 522 in CPE device 128 matches that stored in DM server 175). For example, root certificate 522 is stored in CPE device 128 when CPE device 128 is in the warehouse or when manufactured. Further, device certificate 424 may be stored in CPE device 128 (block 704) (e.g., in memory 330 such that device certificate 424 matches that stored in device certificate DB 620 in DM server 175). For example, device certificate 424 may be installed in user device 125 when user device 125 is configured for use by user 126.

User 126 may arrive at the customer premises to install, reconfigure, and/or monitor CPE device 128 (e.g., FWA device 120). The user connects user device 125 to CPE device 128 with an ethernet cable, for example. The user may connect user device 125 to CPE device 128 with other means, such as a wireless connection (e.g., Bluetooth and/or WiFi). In the case of an ethernet cable, CPE device 128 is aware of the local physical presence of user device 125 to which it is connecting. A channel or connection 802 may be established between user device 125 and CPE device 128 (block 706). For example, using the Ethernet protocol, user device 125 may request and receive an IP address 804 from DHCP server 504.

User device 125 may then direct an HTTP request 810 toward CPE device 128 (block 708). In one embodiment, the IP address of CPE device 128 is predefined. For example, if the IP address for web server 502 in CPE device 128 is 192.168.1.1, web server 502 may have a landing page at the following URL: http://192.168.1.1/index.html (e.g., on port 80). The user may reach that web page by, for example, clicking on a bookmark or typing the URL into web browser 402. Web server 502 may respond 812 to the HTTP request with a landing page (block 710) that requests a credential (e.g., username and/or password). Web browser 402 may then show (block 712) the landing web page 814 with the request for a username and password to the user, for example.

In addition to responding to the HTTP request from web browser 402, web server 502 may also cause server authenticator 506 to send an authentication request 816 from CPE device 128 to user device 125 for a device certificate (block 714). For example, server authenticator 506 may send a request 816 for a device certificate to client authenticator 404 (which may listen on a predefined port, such as, for example, port 2521) at the IP address associated with user device 125. In response, client authenticator 404 may respond 818 (e.g., automatically) with device certificate 424 to server authenticator 506 in CPE device 128 and CPE device 128 receives device certificate 424 (block 716). In one embodiment, client authenticator 404 prompts user 126 before client authenticator 404 sends the certificate to server authenticator 506 (e.g., with a "send" or "ignore" option presented to user 126). In another embodiment, client authenticator 404 responds to server authenticator 506 automatically without prompting user 126.

Server authenticator 506 in CPE device 128 may then determine if certificate 424 is valid (e.g., validate or determine authentic) (block 718). In one embodiment, CPE device 128 may determine whether public-key certificate 424 received by network CPE 128 is valid against root certificate 522. For example, in one embodiment certificate 424 includes the public key associated with a private key (which is associated with DM server 175), and the certificate is signed with the private key. Server authenticator 506 can determine whether certificate 424 was indeed signed using the private key associated with DM server 175. In one implementation, the private key is the private key that corresponds to root certificate 522. Server authenticator 506 can determine whether device certificate 424 was signed using the private key of the trusted CA associated with DM server 175.

If certificate 424 is not authentic (block 720: NO), then authentication may fail and a failed message 822 may be sent to client authenticator 404 and/or web browser 402 (block 722) indicating failure. In one embodiment, server authenticator 506 instructs web server 502 to redirect web browser 402 to a web page indicating that the certificate was not authentic. In another embodiment, server authenticator 506 instructs web server 502 not to communicate with the device associated with the MAC address identified in certificate 424. In another embodiment, client authenticator 404 receives the failed authentication message and prompts user 126 of the failed authentication. In one embodiment, even though authentication failed, user 126 may still enter a username and password into the web page for authenticating and/or authorizing user device 125 to CPE device 128.

If certificate 424 is authentic (e.g., successful validation) (block 720: YES), then server authenticator 506 may determine the actual identity of user device 125 (block 724) and whether web server 502 is communicating with the appropriate device (e.g., whether the device is authorized) (block 726). In one embodiment, server authenticator 506 extracts the specified identity (e.g., MAC address) from certificate 424 and sends a request to ARP server 505 to determine the MAC address (the actual identity of user device 125) associated with the IP address belonging to user device 125. If the MAC address associated with the user device 125 matches the MAC address stored in certificate 424, then web server 502 is communicating with the appropriate device. In other embodiments, the specified identity may include an IMEI and/or a UUID, for example.

If web server 502 is not communicating with the appropriate device (e.g., the device is not authorized) (block 726: NO), then authorization may fail and a failure message 828 may be sent to client authenticator 404 and/or web browser 402 (block 722). In one embodiment, server authenticator 506 instructs web server 502 to redirect web browser 402 to a web page indicating that the MAC address of user device 125 did not match the MAC address in certificate 424. In another embodiment, server authenticator 506 instructs web server 502 not to communicate with the device associated with the MAC address associated with the IP address belonging to user device 125. In another embodiment, client authenticator 404 receives the failed authorization message and prompts user 126 that the MAC address of the user device 125 does not match the MAC address specified in certificate 424. In one embodiment, even though authentication failed, user 126 may still enter a username and password into the web page for authenticating and/or authorizing user device 125 to CPE device 128.

If web server 502 is communicating with the appropriate device (e.g., the device is authorized) (block 726: YES), then server authenticator 506 notifies web server 502 that sessions associated with user device 125 (e.g., sessions associated with the IP address and/or MAC address) are authentic and authorized (block 730). In one embodiment, web server 502 may redirect web browser 402 to a web page that allows user 126 to install, configure, and/or monitor CPE device 128. Additionally or alternatively, client authenticator 404 may receive a successful authorization message and may prompts user 126 of the successful authentication and/or authorization.

Figure 9:
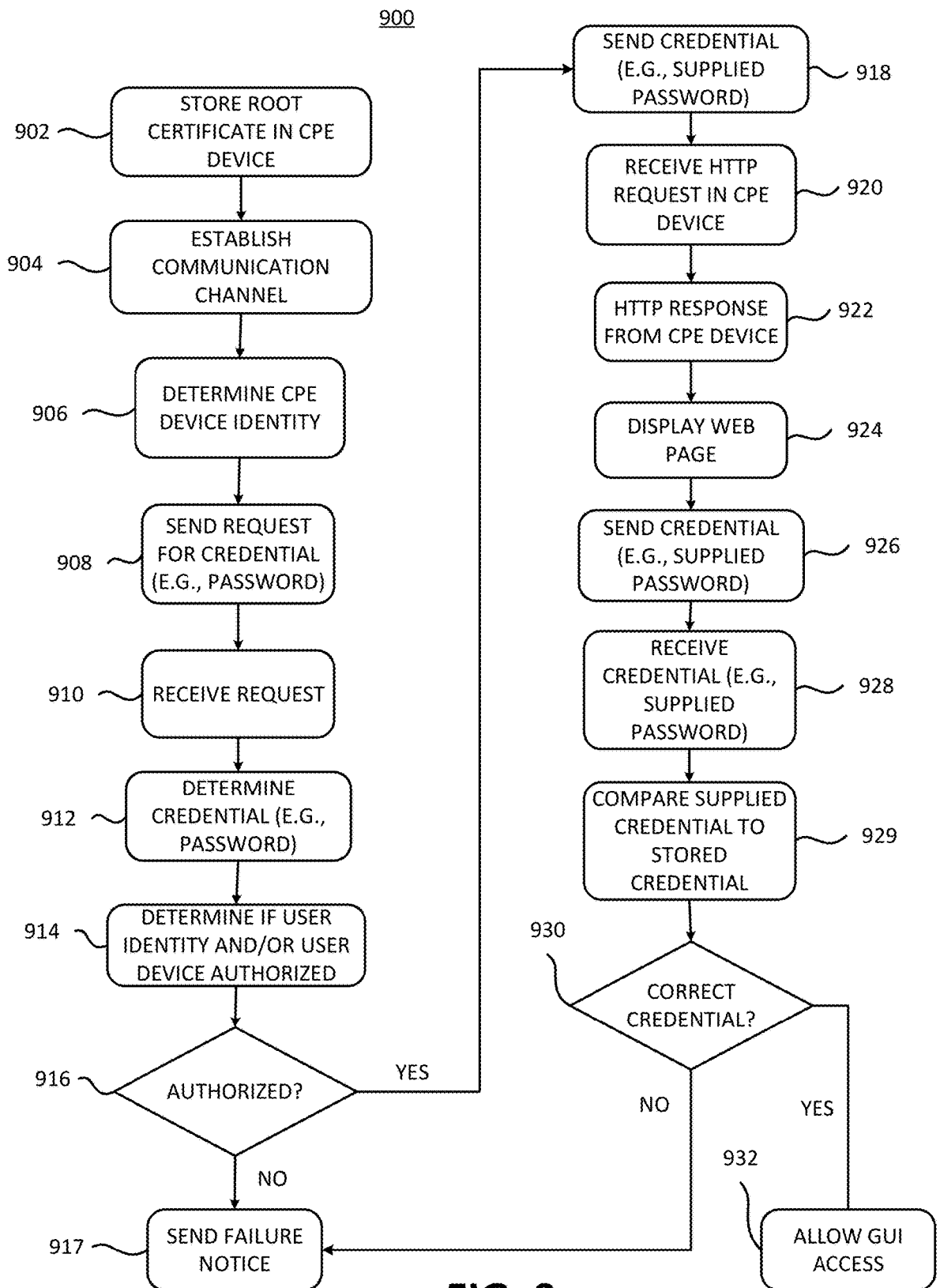
FIG. 9 is a flowchart of an exemplary process for authenticating and/or authorizing a user device in one embodiment.

FIG. 9 is a flowchart of a process 900 for authenticating and/or authorizing user device 125 to CPE device 128 in one embodiment. In some implementations, process 900 may be performed by user device 125, CPE device 128, and/or DM server 175. In other implementations, some or all of process 600 may be performed by another device or a group of devices separate from user device 125, CPE device 128, and/or DM server 175. Process 900 is described with respect to FIG. 10, which is a diagram of an exemplary signal flow 1000 in one embodiment.

In the example of process 900, before user 126 arrives at the customer premises, credentials are stored in CPE device 128 (block 902). For example, while CPE device 128 is in a warehouse or manufactured (e.g., before being sent to a customer), a secret (e.g., seed) and a one-time password algorithm may be stored in CPE device 128. (e.g., stored in non-volatile memory 330 of CPE device 128). The cryptographic one-time password algorithm may include the HOTP algorithm specified in Internet IETF standard RFC 4226, for example. Additionally or alternatively, the cryptographic one-time password algorithm may include an extension to the HOTP algorithm, such as one based on time, e.g., the TOTP algorithm, specified in IETF standard RFC 6238. Additionally or alternatively, a traditional username and/or password is stored in CPE device 128.

User 126 may arrive at the customer premises to install, reconfigure, and/or monitor CPE device 128 (e.g., FWA device 120). In this example, user 126 connects user device 125 to CPE device 128 with an ethernet cable, for example. The user may connect user device 125 to CPE device 128 with other means, such as a wireless connection (e.g., Bluetooth and/or WiFi). In the case of an ethernet cable, CPE device 128 is aware of the local physical presence of user device 125 to which it is connecting. A communication channel 1002 is established between user device 125 and CPE device 128 (block 904). For example, using the Ethernet protocol, user device 125 may request and receive an IP address 1004 from DHCP server 504.

Client authenticator 404 in user device 125 may receive the identity 1006 of CPE device 128 (block 906), such as the MAC address and/or IMEI belonging to CPE device 128. In one embodiment, user 126 may scan a QR code (that includes the identifier) shown on a display of CPE device 128. Alternatively, user 126 may scan a QR code (that includes the identifier) shown on a label affixed to CPE device 128. In another embodiment, user device 125 may scan an NFC chip (attached to CPE device 128) that transmits the identifier. User device 125 (e.g., client authenticator 404) may then send a request 1008 to DM server 175 for a credential (e.g., a one-time password) associated with the CPE device 128 (block 908). The request to DM server 175 may include the identity of CPE device 128, such as the MAC address or IMEI. The request to DM server 175 may also include the identity of user 126 (e.g., a employee ID), the device identifier for user device 125 (e.g., a MAC address), and/or the location of user device 125 (e.g., determined by location determining logic 406). For example, request 1008 may include the employee number 4321 and device identifier D:C:B:A, both associated for Jane Smith. As another example, request 1008 may include the employee number 1234 and device identifier A:B:C:D, both associated for John Smith DM server 175 (e.g., authentication logic 602) receives the request 1008 for the credential (e.g., password) from user device 125 (block 910) and may generate (if appropriate) the credential (e.g., password) corresponding to the identity of CPE device 128 (block 912). Authentication logic 602 may query CPE device password DB 626 to determine the appropriate algorithm and secret. For example, authentication logic 602 may determine the password algorithm and the secret from CPE device password DB 626 and generate the one-time password from that information (e.g., based on time and/or a counter). In this embodiment, the password algorithm may generate a password based on time, a counter, or both (e.g., generate two passwords). In one embodiment, the one-time password may also or alternatively be based on the location of user device 125 and/or the identity of user 126. If not a one-time password, then authentication logic 602 may query CPE device password DB 626 for the password associated with the identified CPE device 128 and determine the static password.

In one embodiment, authentication logic 602 determines whether the user identity and/or user device 125 associated with user 126 is authorized to access CPE device 128 (block 914). For example, user 126 may no longer be employed by the entity (e.g., network service provider) that is associated with CPE device 128. In this embodiment, authentication logic 602 may query HR DB 624 to determine whether user 126 (e.g., as identified by a user identifier such as a username or employee number) is authorized to access CPE device 128. For example, authentication logic 602 may query HR DB 624 with the user identity (e.g., an employee number) to determine the information stored in employment status field 656. Alternatively or additionally, authentication logic 602 may query ticket DB 622 to determine if user 126 (e.g., as identified by an employee number) is authorized to access CPE device 128. That is, authentication logic 602 may determine if the location of user device 125 is near (or matches) the location associated with the ticket for service (e.g., associated with a location of CPE device 128, expected location of CPE device 128, and/or installation location of CPE device 128). Authentication logic 602 may also determine if the current time is close (e.g., matches) to the time associated with the ticket for service (e.g., the specified time in time window field 686). If the location of user device 125 and/or the current time does not match the specified location and/or specified time of the ticket for service, access may be denied to user device 125 and/or user 126. For example, authentication logic 602 may query ticket DB 622 with the username, device ID, current location of user device 125, and/or current time to determine the location of CPE device 128 and the time window as stored in time window field 686. Authentication logic 602 may then determine whether user device 125 is in the correct place at the right time to determine whether user device 125 is authorized.

If the user identity and/or user device 125 associated with user 126 is authorized (block 916: YES), then DM server 175 may send the credential 1011 (e.g., a supplied password such as a one-time password or static password) to user device 125 (block 918). In one embodiment, the credential (e.g., the password) may be inserted into a public-key certificate that is signed by the certificate authority (such that authenticity can be determined by CPE device 128 based on root certificate 522) and sent to user device 125. Additionally or alternatively, the identity of user device 125 (e.g., a MAC address) may be added to the public-key certificate that is sent to user device 125 (e.g., such that CPE device 128 may check the identity as described with respect to process 700). In one embodiment, the credential (e.g., the password) may be inserted into a public-key certificate that is signed by the certificate authority such that authenticity can be determined by CPE device 128 based on root certificate 522. If the user identity and/or user device 125 associated with user 126 is not authorized (block 916: NO), then DM server 175 does not send the credential to user device 125 (e.g., client authenticator 404) (block 917). Instead, if user 126 is not authorized (block 916: NO), then DM server 175 may send a failure message 1010 to user device 125 indicating that user 126 is not authorized to access user device 125.

User 126 may instruct user device 125 (e.g., web browser 402) to direct an HTTP request 1012 toward CPE device 128 (block 920). In one embodiment, the IP address of CPE device 128 is predefined (e.g., 192.168.1.1). In this example, web server 502 may have a landing page at the following URL: http://192.168.1.1/index.html (e.g., on port 80). The user may instruct user device 125 to direct the HTTP request by, for example, clicking on a bookmark or typing the URL into web browser 402. Web server 502 may respond 1014 to the HTTP request with a landing page (block 922) that requests a credentials. Web browser 402 may then show the landing web page 1015 with the request for a credential (e.g., a supplied password) (block 924), which the user may supply by entering (e.g., from the message with the credential from DM server 175) or may be supplied automatically by client authenticator 404. The supplied credential (e.g., supplied password) is sent from user device 125 to CPE device 128 (block 926). As noted above, the supplied credential may be part of the private-key certificate passed from user device 125 to CPE device 128.

CPE device 128 (e.g., server authenticator 506) receives the credential 1016 (e.g., the supplied password) (block 928). If the credential is correct (e.g., they correspond to the credentials stored in or calculated by server authenticator 506) (block 930: YES), then user device 125 and/or user 126 are authorized to access CPE device 128 (block 932). In one embodiment, web server 502 may redirect web browser 402 to a web page indicating that allows user 126 to install, configure, and/or monitor CPE device 128. Additionally or alternatively, client authenticator 404 may receive a successful authorization message and may prompts user 126 of the successful authentication and/or authorization.

If the credential is not correct (e.g., they do not correspond to the credentials stored in or calculated by server authenticator 506) (block 930: NO), then user device 125 and/or user 126 is not authorized to access CPE device 128. In one embodiment, server authenticator 506 instructs web server 502 to redirect 1018 web browser 402 to a web page indicating a failure to authenticate (block 934). In another embodiment, server authenticator 506 instructs web server 502 not to communicate with user device 125.

Once the user 126 is authenticated and authorized, user 126 may install, configure, and/or monitor CPE device 128. For example, user 126 may move FWA device 120 to different locations in the customer's premises to determine the best signal quality for FWA device 120 to receive wireless signals from wireless station 160. To do so, user 126 may use the graphical user interface of the web server to configure and monitor FWA device 120. The methods and systems described may secure CPE device 128 (e.g., FWA device 120) while making authentication and/or authorization seamless in some implementations.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Figure 8:
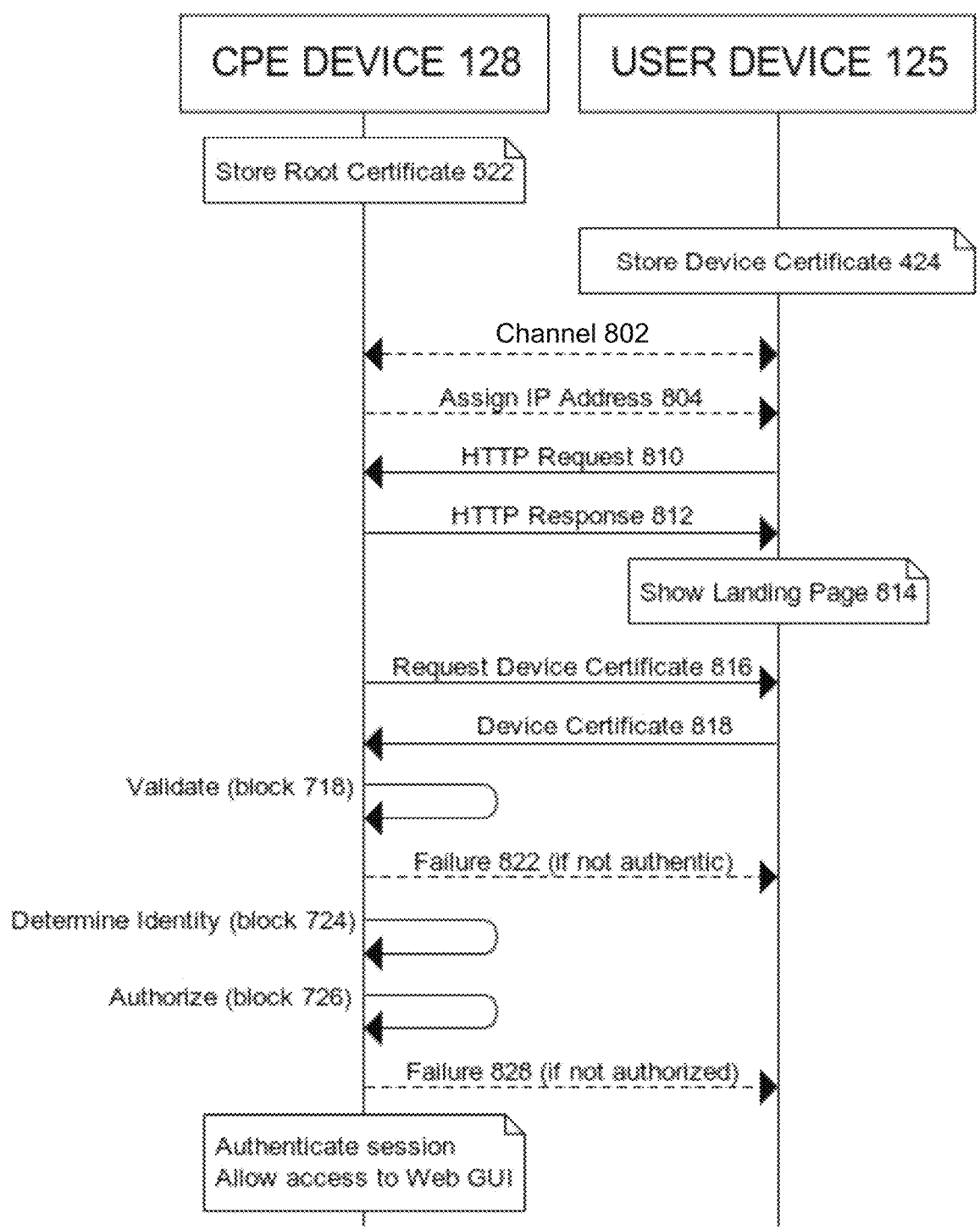
FIG. 8 is block a diagram of an exemplary signal flow in one embodiment.
Figure 10:
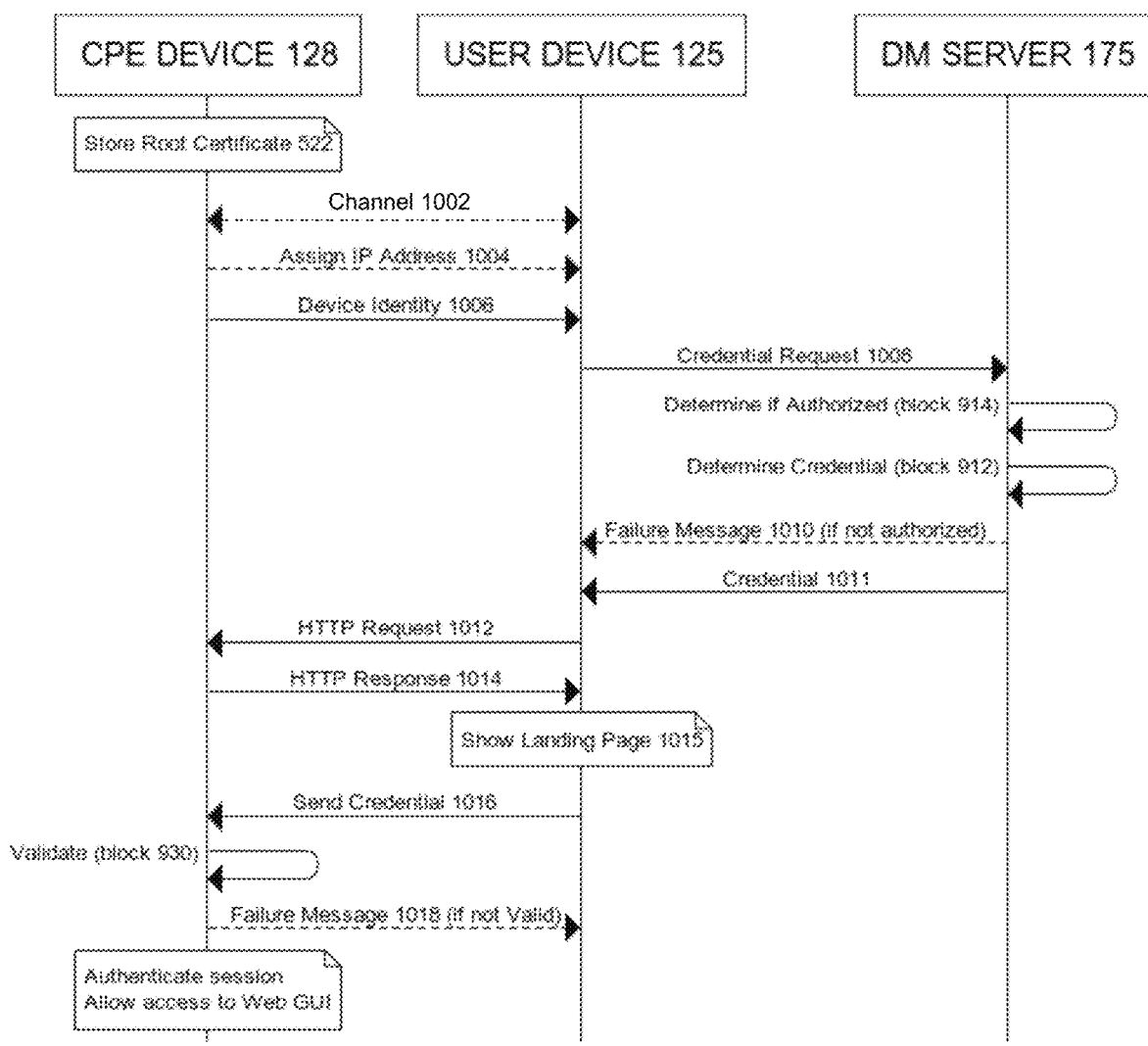
FIG. 10 is a diagram of an exemplary signal flow for authentication and/or authorization in one embodiment.

For example, while a series of blocks have been described with respect to FIGS. 7 and 9, and a series of signals has been described with respect to FIGS. 8 and 10, the order of the blocks and/or signals may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods does not limit the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   establishing a communication channel between a user device and a customer premises equipment (CPE) device;
   receiving, by the CPE device from the user device, a public-key certificate including a specified identity of the user device;
   determining whether the public-key certificate received by the CPE device is valid against a root certificate stored in the CPE device;
   determining an actual identity of the user device;
   indicating that the user device is authentic and authorized when the public-key certificate received by the CPE device is valid against the root certificate and when the actual identity of the user device matches the specified identity in the public-key certificate;
   querying a database to determine whether a user identity associated with the user device is authorized to access the CPE device and sending a supplied password to the user device when the user identity is authorized;
   receiving, by the CPE device from the user device, the supplied password;
   comparing, by the CPE device, the supplied password with a stored password; and
   indicating that the user identity is authorized to access the CPE device when the supplied password matches the stored password.

2. The method of claim 1, wherein the specified identity and the actual identity each include a media access control (MAC) address.

3. The method of claim 1, further comprising:
determining a location of the user device; and
determining a location associated with the CPE device, wherein sending the supplied password includes sending the supplied password to the user device when the location of the user device matches the location associated with the CPE device.

4. The method of claim 1, further comprising:
determining a current time;
querying a second database to determine whether the user identity is authorized to access the CPE device during a specified time; and
sending the supplied password to the user device when the current time matches the specified time.

5. The method of claim 1, wherein the supplied password includes a one-time password.

6. The method of claim 1, wherein the supplied password includes a one-time password based on a current time.

7. The method of claim 1, wherein the supplied password includes a one-time password based on a counter.

8. The method of claim 5, wherein the public-key certificate includes the one-time password.

9. The method of claim 1, further comprising:
serving a graphical user interface to the user device to enable configuration of the CPE device.

10. A system including a first network device and a second network device,
wherein the first network device comprises:
a communication interface having a receiver and a transmitter;
a memory for storing instructions and a root certificate; and
a processor configured to execute the instructions to:
establish a communication channel between a user device and the first network device,
receive, by the first network device, a public-key certificate including a specified identity of the user device,
determine, by the first network device, whether the public-key certificate received by the first network device is valid against the root certificate,
determine, by the first network device, an actual identity of the user device, and
indicate, by the first network device, that the user device is authentic and authorized when the public-key certificate received by the first network device is valid against the root certificate and when the actual identity of the user device matches the specified identity in the public-key certificate, and
wherein the second network device comprises:
a communication interface having a receiver and a transmitter;
a memory for storing instructions; and
a processor configured to execute the instructions in the memory of the second network device to: query a database to determine whether a user identity associated with the user device is authorized to access the first network device and send a supplied password to the user device when the user identity is authorized,
wherein the processor in the first network device is further configured to:
receive, by the first network device from the user device, the supplied password;
compare, by the first network device, the supplied password with a stored password; and
indicate that the user identity is authorized to access the first network device when the supplied password matches the stored password.

11. The system of claim 10, wherein the specified identity and the actual identity each include a media access control (MAC) address.

12. The system of claim 10, wherein the processor of the second network device further is configured to execute the instructions to:
determine a location of the user device; and
determine a location associated with the first network device, wherein sending the supplied password includes sending the supplied password to the user device when the location of the user device matches the location associated with the first network device.

13. The system of claim 10, wherein the processor of the second network device is further configured to execute the instructions to:
determine a current time;
query a second database to determine whether the user identity is authorized to access the first network device during a specified time; and
send the supplied password to the user device when the current time matches the specified time.

14. The system of claim 10, wherein the supplied password includes a one-time password.

15. The system of claim 10, wherein the supplied password includes a one-time password based on a current time.

16. The system of claim 10, wherein the supplied password includes a one-time password based on a counter.

17. The system of claim 14, wherein the public-key certificate includes the one-time password.

18. The system of claim 10, wherein the processor of the first device is further configured to execute the instructions to serve a graphical user interface to the user device to enable configuration of the first network device.

19. A method comprising:
establishing a communication channel between a user device and a customer premises equipment (CPE) device;
receiving, by the CPE device from the user device, a public-key certificate including a specified identity of the user device;
determining whether the public-key certificate received by the CPE device is valid against a root certificate stored in the CPE device;
determining an actual identity of the user device;
indicating that the user device is authentic and authorized when the public-key certificate received by the CPE device is valid against the root certificate and when the actual identity of the user device matches the specified identity in the public-key certificate;
determining a location of the user device or determining a current time;
determining a location associated with the CPE device;
querying a database to determine whether a user identity associated with the user device is authorized to access the CPE device during a specified time or at a specified location associated with the CPE device and sending a supplied password to the user device when the user identity is authorized;
receiving, by the CPE device from the user device, the supplied password;
comparing, by the CPE device, the supplied password with a stored password; and indicating that the user identity is authorized to access the CPE device when the supplied password matches the stored password.

20. The method of claim 19, wherein the supplied password includes a one-time password, the method further including:
serving a graphical user interface to the user device to enable configuration of the CPE device.

\* \* \* \* \*